United States Patent [19]

La Monica

[11] 4,303,009
[45] Dec. 1, 1981

[54] APPARATUS CAPABLE OF OPERATING BOTH AS NITROGEN GENERATOR AND CARBON DIOXIDE ABSORBER, PARTICULARLY FOR THE PRESERVATION UNDER CONTROLLED ATMOSPHERE OF PRODUCTS, SUCH AS FRUIT AND VEGETABLE PRODUCTS

[75] Inventor: Gaspare La Monica, Milan, Italy

[73] Assignee: Samifi Babcock, S.p.A, Milan, Italy

[21] Appl. No.: 25,612

[22] Filed: Mar. 30, 1979

[30] Foreign Application Priority Data

Apr. 6, 1978 [IT] Italy .............................. 22035 A/78

[51] Int. Cl.³ .............................................. A23B 7/00
[52] U.S. Cl. ...................................... 99/474; 99/473; 422/40; 422/113
[58] Field of Search ................................. 99/473–476, 99/516; 422/40, 115, 116, 111, 113, 198, 208, 169, 129; 165/170

[56] References Cited

U.S. PATENT DOCUMENTS

| | | | |
|---|---|---|---|
| 2,934,322 | 4/1960 | Hazard | 165/170 |
| 3,203,771 | 8/1965 | Brown et al. | 422/40 |
| 3,205,049 | 9/1965 | Lannert et al. | 422/40 |
| 3,445,193 | 5/1969 | Lamp, Jr. | 99/473 |
| 3,445,194 | 5/1969 | Thomas et al. | 99/473 |
| 3,453,085 | 7/1969 | Lannert et al. | 422/40 |

Primary Examiner—Philip R. Coe
Assistant Examiner—Timothy F. Simone
Attorney, Agent, or Firm—Robert E. Burns; Emmanuel J. Lobato; Bruce L. Adams

[57] ABSTRACT

Apparatus capable of operating both as nitrogen generator and carbon dioxide absorber, particularly for the preservation under controlled atmosphere of fruit and vegetable products, comprising a generator in turn including a burner, having a mixture of air and fuel gas supplied thereto, and in which a combustion is effected, so that a mixture exits from the generator as comprising steam, nitrogen and carbon dioxide, two absorbers each of which for retaining carbon dioxide, connection means between the generator and absorbers, comprising a condenser, for the removal of the steam, so as to supply to either absorber only a mixture of nitrogen and carbon dioxide, means for feeding the gas exiting from either absorber to the cell or storage room containing the products, or alternatively to the outlet, means for connecting the cell with either absorber for supplying the cell atmosphere thereto, means by which when one of the abosrbers is operating to retain carbon dioxide of the gaseous mass from the burner or cell, the other absorber is passed through by scavenging air and vice versa, means for operating the apparatus only as nitrogen generator or only as carbon dioxide absorber of the cell atmosphere, means for water cooling said condenser and burner, comprising two opposite walls of the burner, each of which includes a gas passed through by the cooling water, and in the gaps means for distributing the water circulating in the gaps, so as to cause a substantially even distribution of the temperature.

7 Claims, 9 Drawing Figures

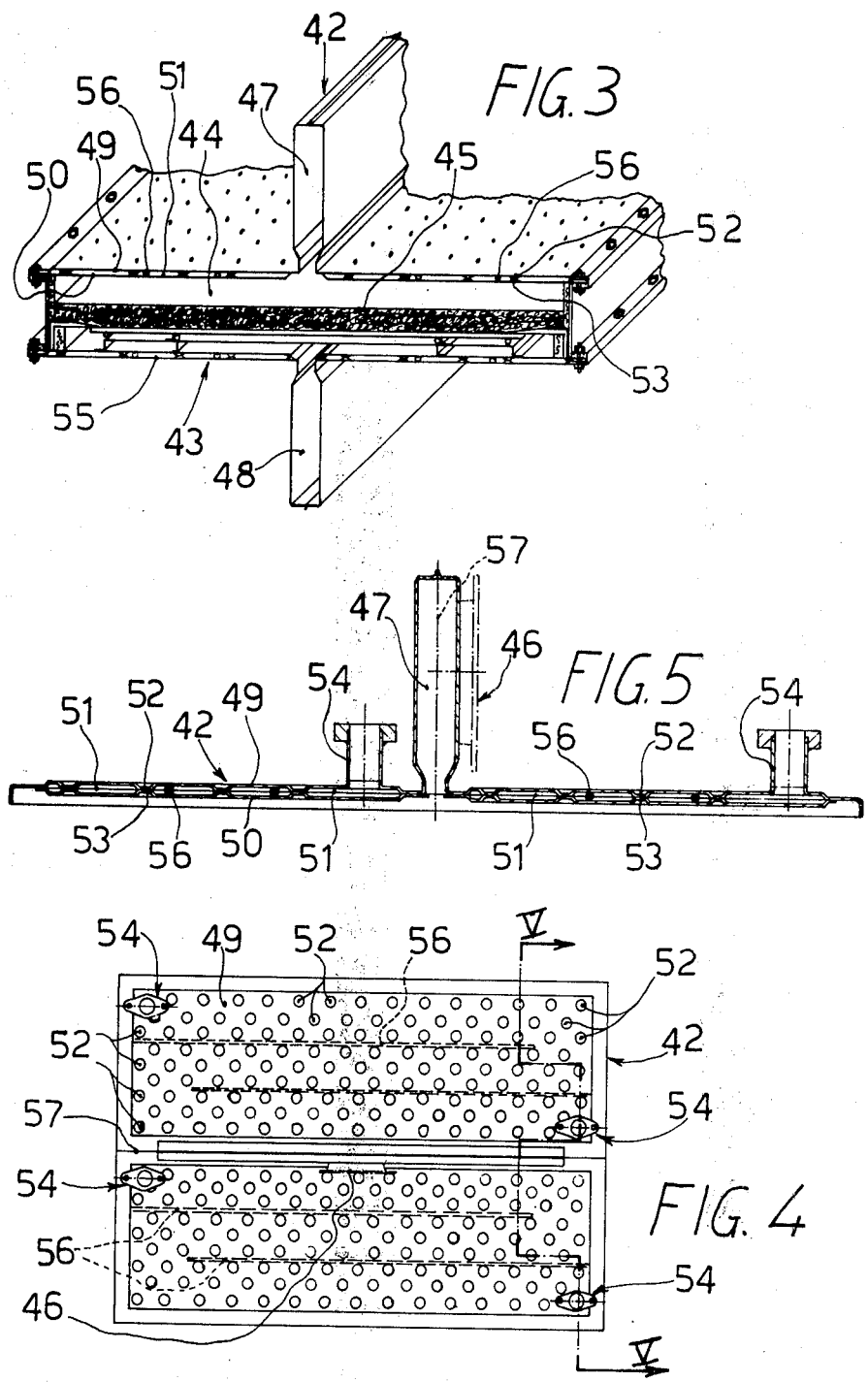

APPARATUS CAPABLE OF OPERATING BOTH AS NITROGEN GENERATOR AND CARBON DIOXIDE ABSORBER, PARTICULARLY FOR THE PRESERVATION UNDER CONTROLLED ATMOSPHERE OF PRODUCTS, SUCH AS FRUIT AND VEGETABLE PRODUCTS

BACKGROUND OF THE INVENTION

This invention relates to an apparatus capable of operating both as nitrogen generator and as carbon dioxide absorber, particularly for the preservation of products under controlled atmosphere, such as fruit and vegetable products.

It is well known that, for example, the preservation of fruit in refrigerating rooms or freezers, wherein the atmosphere prevailingly comprises nitrogen at low oxygen contents and controlled values of carbon dioxide, would yield a substantial extension of preservation period and a very considerable improvement in quality.

SUMMARY OF THE INVENTION

Owing to its feature of operating as nitrogen generator, an apparatus according to the invention is advantageously used for rapid setting up or rating of preservation cells or storage rooms, since the generated atmosphere is admitted into such cells or storage rooms at a slight pressure and causes the pre-existing air to exit, so that the ideal conditions are provided in a short time for any type of fruit and vegetable products.

Therefore, there is no need to wait for a decrease in oxygen content within the cell or storage room due to fruit respiration, as the oxygen is ejected because of the admission of the generated atmosphere.

The atmosphere being generated by the apparatus comprises, for example, 98.5% nitrogen and 1.5% oxygen, but may also contain percentages of carbon dioxide that can be adjusted as desired.

Thus, the generator affords to maintain at any time the best conditions for preservation and further allows the opening of the cells or storage rooms to withdraw some of the product, since setting up or rating is provided by admitting the most suitable atmosphere. During the preservation period (that is, after the cells or storage rooms have been set up by the "generator"), oxygen is continued to be slowly absorbed by fruit, and carbon dioxide and steam are emitted, whereby the percentage of carbon dioxide tends to increase.

The content of carbon dioxide can be controlled by using the second function of the apparatus, that is to say the function of carbon dioxide absorber.

In such a case, the generator operation is shut off and only the absorber is operating. The atmosphere of the cell or storage room is supplied to said absorber, wherein carbon dioxide is retained, and is then sent back to the cell or storage room. Therefore, the apparatus is for providing and maintaining an atmosphere with predetermined percentages of the components, which are nitrogen, oxygen and carbon dioxide, in any environment requiring certain percentages (varying in accordance with use requirements) of the above mentioned components. As above specified, the apparatus is particularly applied in preservation of fruit and vegetable products, but could be also used for other applications.

The apparatus essentially comprises a burner, to which a mixture comprising air and a fuel gas, such as propane or methane, in the desired percentages is supplied.

Oxygen initially present in air reacts with propane or methane elements (which just occurs by combustion in said burner), so that a gaseous mixture comprising nitrogen, carbon dioxide and water exits from the burner.

Means are provided for substantially removing said water and carbon dioxide and supplying nitrogen to the cell or storage room.

Accordingly, a basic portion of the apparatus is formed by the reactor comprising said burner. In order to withdraw the combustion heat, the burner is water cooled.

Such prior art apparatuses suffer from a serious disadvantage that the temperature distribution is not quite uniform in elements having the cooling water passing therethrough, whereby tension differentials are built up, at times causing breakages in the materials.

Therefore, it is an object of the present invention to provide in such an apparatus, and more particularly in the burner cooling device, means for evenly distributing the temperature throughout the surface of the element having water passing therethrough, and accordingly smooth uniform tensions, substantially avoiding any risk of breakages.

Still regarding the cooling system associated with the burner, it is another object of the present invention to provide a smooth combustion with a resulting nearly complete elimination of any possible flash back.

It is an essential feature of the apparatus according to the present invention that the burner has connected thereto two parts which substantially comprise two opposite walls (or "covers") of the burner, each of which include a gap for the passage of the cooling water therethrough. Said gap is formed between two sheets or plates provided with indentations or the like corresponding to one another and welded to one another.

Means are also provided for causing the water circulating in such a gap or channel to follow a predetermined path, such as for example steel rods which, as suitably arranged, cause the water to follow a substantially coiled path.

Owing to the above described indentations suitably distributed in the gap space (as it will be better seen in the following description relating to the accompanying drawing) and provision of said rods, a smooth uniform temperature distribution for the cooling plate is provided, and as a result any risk of breakages is substantially avoided.

A smooth combustion is further provided with all of the resulting advantages and, inter alia, the elimination or substantial reduction in possibility of flash backs.

Two absorbers are provided in the apparatus according to the invention, each of which contains active carbon and suitable to retain carbon dioxide. When one of such said absorbers is operating to retain carbon dioxide (present in the mixture from the burner and cell or storage room), the other is being scavenged or vice versa. Scavenging or regeneration is effected by air supplied to the absorber, passes through the same and exits therefrom as directed to a stack.

The gaseous mass from the absorbers, wherein carbon dioxide has been retained, pass through pipings that terminate in a pipe which in turn terminates in a three-way valve. Two tubular sections extend from the latter and communicate with two tubes, respectively, of which one is directed to the stack and the other to the cell or storage room.

A further feature of the present invention is that a "non-return" or check valve is provided in the tubular section connecting said valve to the tube directed to the stack, in order that during the opening of the three-way valve the gaseous mass conveyed or transferred to the stack is prevented from passing to the delivery piping in the cell or storage room.

It is another feature of the present invention that means are provided for removing water particles present in the gaseous mass from a condenser downstream of the burner, or from the cell or storage room, and directed to the absorbers. Such a water removal is for protecting the active carbon in said absorbers.

Such means comprise, for example, an automatic condensate trap, essentially including a cylindrical chamber having therein a float which is connected to means capable of sealing a discharge or outlet hole by taking advantage of the weight of said float with said means connected thereto.

The top portion of said chamber receives the two pipings intended to be passed through by the gaseous mass from the condenser (downstream of the burner) and the gaseous mass from the cell or storage room, respectively, while the piping to the absorbers extends from said top portion of said chamber.

The water contained in the gaseous mass from the condenser or cell will collect (by gravity) on the bottom of said chamber, so that after reaching a certain level said float raises and said discharge or outlet hole is cleared of. Then, following the discharge or outlet of some amount of water, the float is lowered, whereby the discharge or outlet hole is sealed again, and so on.

In order that the features and advantages of an apparatus according to the present invention be more clearly shown, an exemplary embodiment of an apparatus according to the present invention will now be described with reference to the accompanying drawings, in which:

FIG. 3 is a sectional view taken along a vertical plane showing the reactor as assembled;

FIG. 4 is a plan view showing a part or cover of said reactor;

FIG. 5 is a sectional view on enlarged scale relative to FIG. 4, taken along line V—V of FIG. 4;

DESCRIPTION OF THE PREFERRED EMBODIMENTS

The device or apparatus shown in the accompanying drawings performs, as above referred to, the two following functions distinguished from each other:
  (a) nitrogen generator;
  (b) carbon dioxide ($CO_2$) absorber.

Nitrogen is actually obtained through the use of air from which oxygen is removed, as hereinafter explained.

More particularly, such a gas as, for example, propane or methane is burnt in a burner, to which a mixture of air and said gas in the desired percentages is supplied.

Figure 1:
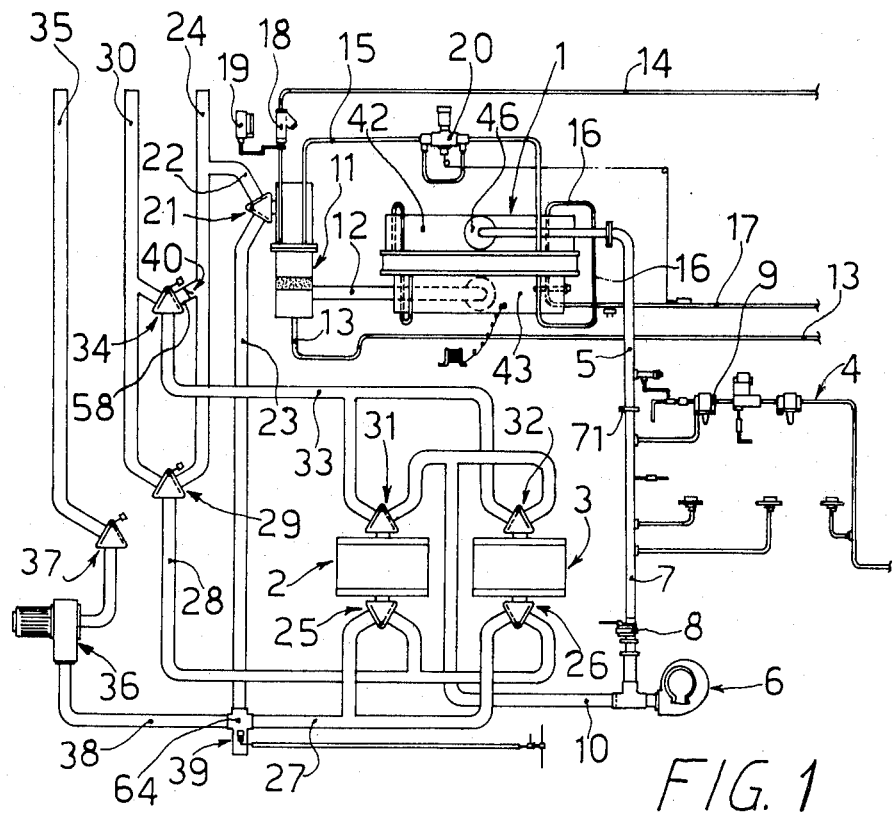
FIG. 1 is a diagrammatic general view showing the apparatus according to the invention.

In the general scheme of the apparatus shown in FIG. 1, the generator comprises a reactor designated as a whole by 1.

Said mixture is fed to said reactor, from which the combustion products exit, that is carbon dioxide ($CO_2$), water ($H_2O$) and nitrogen.

By means to be described in the following water and carbon dioxide are removed, so that nitrogen remains at last and is supplied to the cell (or cells), having stored therein the products to be preserved, such as fruit and vegetable products.

The fuel gas (propane or methane) to be fed to reactor 1 (including the burner) is supplied from a suitable source through a tube 4 and reaches a mixing tube 5 which, in turn, is connected to said reactor 1. Air is fed by a fan 6 along a tube 7, thus also reaching a mixer 5, so that the desired mixture of air and gas directed to the reactor 1 is formed in the mixer.

Reference numeral 8 designates an air adjusting valve to provide an air-gas mixture having the desired composition. Similarly, a valve 9 is for adjusting the amount of gas reaching the mixer 5.

A condenser, designated as a whole by 11, is provided downstream of reactor 1 and connected thereto by a tube 12. In said condenser 11, receiving the combustion products from the reactor 1 (nitrogen, carbon dioxide and water in the form of steam) steam condensates and liquid water is discharged through a tube 13.

A water cooling device is provided, comprising a tube 14, along which water from a suitable source reaches the above mentioned condenser 11.

The water cooling the condenser 11 passes through a connection tube 15 to cool down said reactor 1. More particularly, said tube 15 reaches a top portion of the reactor (to be particularly hereinafter described) and a tube 16 projects from said portion and reaches a lower portion of the reactor (also to be hereinafter described) from which a water discharge tube 17 extends.

Reference numeral 18 designates a water filter, 19 a pressure switch and 20 a thermostatic water valve.

Downstream of condenser 11 there is provided a system comprising two absorbers designated by 2 and 3, respectively, for retention of carbon dioxide, so that only nitrogen is fed to the cell or storage room containing the products to be preserved.

More particularly, said condenser 11 communicates with a three-way valve 21, which can be connected with a tube 22 and a tube 23. Tube 22 is connected to a tube 24 directed to the stack (for gas exhaust), and tube 23 is connected to two valves 25 and 26 which are connected with the absorbers 2 and 3, respectively.

Each of said valves 25 and 26 is a three-way valve, while said three-way valve 21 always communicates with said condenser 11. The inside of valve 21 is alternately connected with tube 22 (and hence with tube 24) or with tube 23.

More particularly, valve 21 comprises a movable rotable member to either of two end of stroke positions, at one of which shutting off the connection with tube 22, while the inside of the valve communicates with tube 23. At the other position, said member shuts off the connection with tube 23 and enables the connection between the inside of the valve and tube 22. Reference numeral 29 indicates a three-way valve, having said tube 24 directed to the stack and a tube 30 connected with the cell or storage room terminating thereto.

A tube 28 connected to said valves 25 and 26 extends from said valve 29. This tube 28 always communicates with the inside of valve 29, the latter comprising a movable member capable of taking two positions, and particularly one position, at which it cuts off the communication between the inside of the valve and tube 30, allowing the communication between the inside of the valve and tube 24, and a second position, at which it allows the communication between the inside of the valve and tube 30, shutting off the communication between the inside of the valve and tube 24. The two three-way valves 25 and 26 are always in communication with the absorbers 2 and 3 (that is, the inside of each valve is always in communication with the corresponding absorber).

Each of said valves 25 and 26 (similar to those above described) comprise a movable member which can take two positions, namely one position at which the communication is allowed between the inside of the valve and tube 28, while shutting off the communication between the inside of the valve and tube 27, and a second position at which the communication is inhibited between the inside of the valve and tube 28, while allowing the communication between the inside of the valve and tube 27.

Further two three-way valves 31 and 32 are provided, these valves being connected to the absorbers 2 and 3, respectively. Each of said valves 31 and 32 (completely similar to those above described) are constantly connected with the corresponding absorber and also comprise a member movable between two positions, at one of which said movable member allows communication between the inside of the valve and a tube 33, while inhibiting the communication between the inside of the valve and a tube 10, and at the other position said member inhibits the communication between the inside of the valve and tube 33, while allowing the communication between said tube 10 and the inside of the valve.

Tube 33 is connected to a three-way valve 34 which is also similar to those above described. More particularly, said tube 33 is always in communication with the inside of valve 34 and the latter also comprises a member movable between two positions, at one of which said member shuts off the communication or passage between the inside of valve 34 and tube 24, while allowing the passage between the inside of the valve and tube 30, and at the other position said member allows the communication between the inside of the valve and tube 24, while inhibiting the communication between the inside of the valve and tube 10.

The above described tube 10 is connected with the fan 6 above referred to.

A tube 35 from the cell or storage room is provided and connected by a two-way valve 37 with a fan 36. This valve 37 comprises a movable member which, when at a determined position cuts off the passage between tube 35 and fan 36; when displaced from said position, said member allows a passage from tube 35 to fan 36.

An automatic condensate trap is provided (which will be particularly described in the following) and designated as a whole by 39, to which tubes 23, 27 and 38 are connected.

A non-return or check valve, designated as a whole by 40, is provided in the tube section 58 from valve 34 to discharge or exhaust tube 24, this valve allowing the gas passage only from valve 34 to tube 24 and not vice versa, for reasons to be better described in the following.

Particularly referring to FIGS. 2 through 6, the above mentioned reactor designated as a whole by 1, will now be particularly described.

Figure 2:
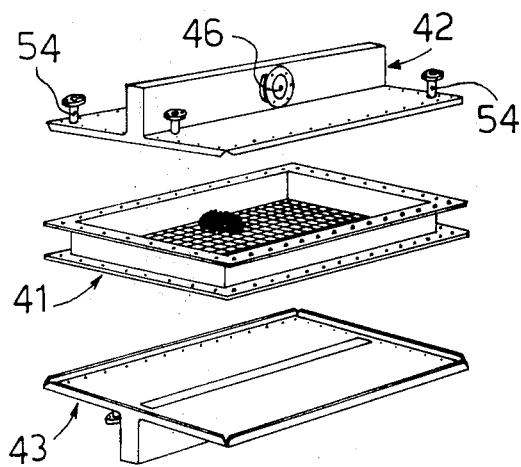
FIG. 2 is also a diagrammatic, but perspective view showing some parts comprising a reactor.

Some essential parts separately indicated by 41, 42 and 43 are shown in FIG. 2. Part 41 comprises the central part, and parts 42 and 43 are secured to said central part 41. In the present description, said parts 42 and 43 are referred to as "covers", with part 42 forming the upper cover or lid of the reactor and part 43 forming the lower cover or lid thereof.

As an essential part or component, said reactor 1 comprises the burner within the space or chamber 44 between said lids and also as essential parts further comprises a cooling system including said lids 42 and 43.

A bed of catalytic material 45 is provided in said burner.

The upper lid 42 comprises an inlet flange or union 46, through which the mixture from the above mentioned mixer 5 arrives. The lower lid 43 comprises a similar flange or union, from which the tube 12 extends for the passage of the combustion products from the reactor, or burner, to the condenser 11.

The gaseous mixture reaching the manifold 47 through the flange or union 46 can thus burn in the burner 44, which is in communication with said manifold 47. The combustion products arrive at a manifold 48, shown in FIG. 3, and therefrom arrive at condenser 11 passing through tube 12.

The upper lid 42 will now be particularly described, it being understood that the lower lid 43 is completely similar.

Cover or lid 42 essentially comprises two sheets or plates designated by 49 and 50, respectively, welded to each other and shaped to form a gap 51. More particularly, said two sheets or plates 49 and 50 have bossages 52 and 53 welded to each other, that is to say each bossage 52 of sheet or plate 49 has a indentations 53 of sheet or plate 50 corresponding thereto. The two an ndentation 52 and 53, which are thus corresponding as particularly shown in FIG. 5, are welded to each other, as above stated. The cover or lid 42 is provided with tubes or connections 54, through which the cooling water enters and exits.

Therefore, the cooling water circulates within the gap 51.

Water having passed through the gap 51 of cover or lid 42, exits therefrom through a connection 54 directed through tube 16 (shown in FIG. 1) to the similar gap 55 (shown in FIG. 3) of the lower cover or lid 43.

Figure 6:
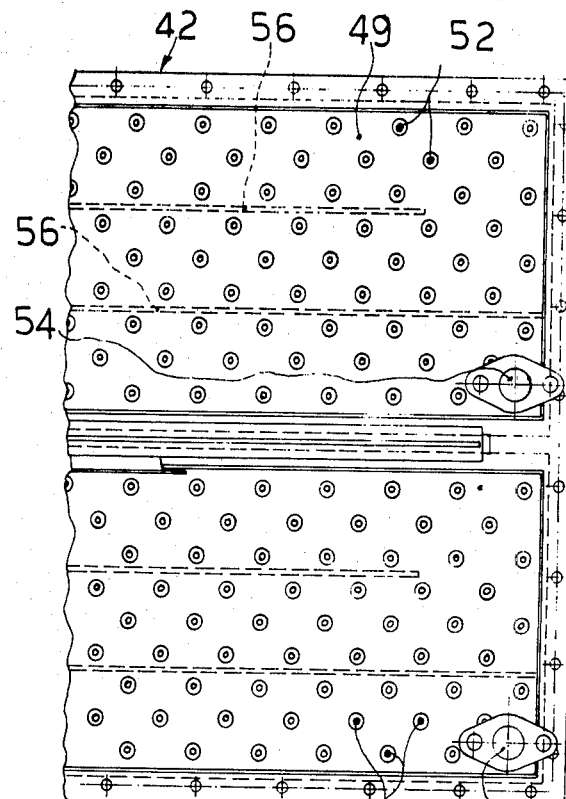
FIG. 6 is a plan view showing for a better explanation an enlarged detail of FIG. 4.

Inside of gap 51, as well as gap 55, rods 56 are provided, such as stainless steel rods, which are so positioned as to cause the cooling water to follow a substantially coiled path, the arrangement of said rods 56 being clearly shown in FIGS. 4 and 6.

As it will be appreciated from FIGS. 4 and 5, said upper cover or lid 42 actually has two distinct gaps 51 (for an observer looking at FIG. 5, such gaps are the right gap and left gap relative to the median plane 57, respectively; while for an observer looking at FIG. 4, such gaps are respectively above and below said median plane 57).

Each of said two gaps or chambers 51 have an inlet conduit or connection 54 for the cooling water and a similar outlet conduit or connection also designated by 54.

Among the remarkable advantages of the above described heat exchanger, it should be noted that the system or combination of indentations 52, 53 and rods 56 enables an even distribution for the temperature throughout the surface of plate 42 (and accordingly also plate 43 which is completely similar to plate 42), thus resulting in substantially avoiding any risk of breakages or failures because of the smooth and even stresses.

Additionally, a smooth combustion is provided with a resulting nearly complete elimination of flash backs.

The non-return or check valve 40 will now be particularly described.

Figure 7:
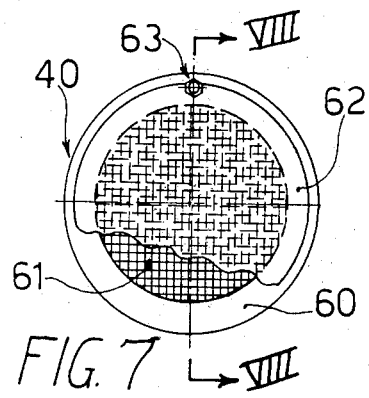
FIG. 7 is a view showing a detail of a non-return or check valve.
Figure 8:
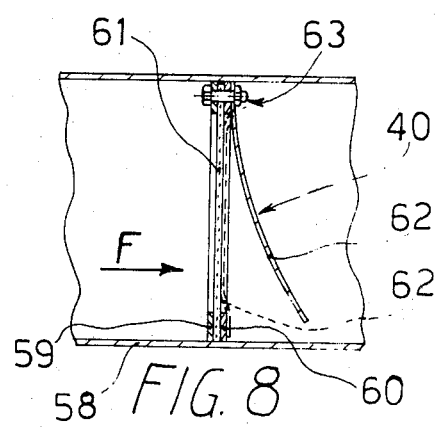
FIG. 8 is a sectional view taken along line VIII—VIII showing said valve.

Said valve (designated by 40 in said FIG. 1) is shown in its details in FIGS. 7 and 8 of the accompanying drawings.

Two rings 59 and 60 are provided in said tube 58 as integrally formed therewith, clamping a net 61 therebetween. A disc 62 of light flexible material, such as rubber, is provided as secured at 63 to said ring assembly 59, 60.

It clearly appears that a pressure exerted in the direction of arrow F, that is in the direction from valve 34 to tube 24, would cause disc 62 to be flexed, and accordingly the gaseous mass is allowed to pass through said net or wire mesh 61. It is as well apparent that a pressure exerted in the opposite direction would press disc 62 against said net or wire mesh 61 and ring 60, as shown by broken lines in FIG. 8, and therefore said gaseous mass is inhibited from passing in such a direction.

The above described non-return or check valve 40 is provided to prevent the air conveyed along tube 24 to the stack from passing into the delivery pipe in cell or storage room 30 in the time period at which valve 34 opens, that is in the time taken by the above mentioned movable member of the valve to pass from one to the other position. Said time period or interval is not negligible (for example, in the order of 3-4 seconds).

Thus, it should be noted that the air conveyed through tube 24 to the stack is rich of oxygen, and accordingly should not reach the cell or storage room where an atmosphere poor of oxygen should exist. It should also be noted that the pressure existing in tube 24 directed to the stack is often higher than that in tube 30 directed to the cell or storage room. Should the above described non-return or check valve 40 be provided, an undesirable passage of air rich of oxygen would exist to the cell or storage room leading tube 30.

The above mentioned automatic condensate trap 39 will now be particularly described.

Figure 9:
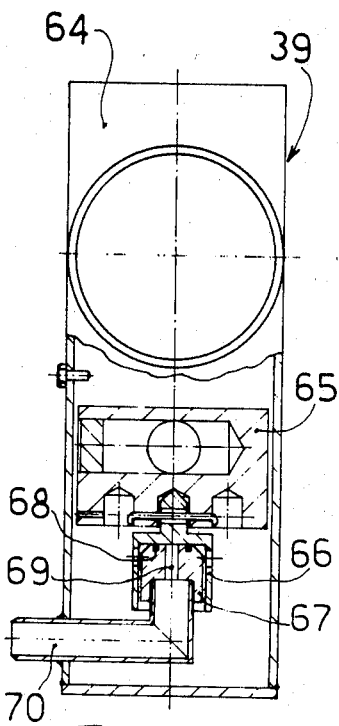
FIG. 9 is a fragmentary sectional view showing an automatic condensate trap.

Said trap 39, as schematically indicated in FIG. 1 and particularly shown in FIG. 9, comprises a T-shaped tubular body 64, having therein a float 65 connected to a stopper 66 for sealing against a seat 67 having an outlet hole 69 passing therethrough and provided with a gasket 68.

Initially, assume that no water is stored in body 64, or only a small amount at a minimum level, so that the float is at low position as defined by closing of hole 69. Now, should the gaseous mixture at the above described condensate trap 39 through tube 23 or tube 38 contain particles of water (substantially droplets of water), the latter would of course fall down in said T-shaped tube 64. As the water collects at the bottom of said tube, the water level rises, and at some point said float 65 raises drawing along said stopper 66, and accordingly water passes through hole 69 of seat 67 and exits through a tube 70 leading to outlet or exhaust. Therefore, the water level is again lowered, so that the float moves down again and closes said hole 69, and so on. Thus, the water does not reach the absorbers 2 and 3, and accordingly the active carbon is protected.

The operation of the above described apparatus or device is substantially as follows.

Stating in advance that the above described apparatus can operate both as nitrogen generator for the cell or storage room, and as absorber of carbon dioxide which is in excess amount in such a cell or storage room, the operation of the apparatus as nitrogen generator will now be described and then the operation will be described for the apparatus merely acting as an absorber of carbon dioxide, excluding in such a case the above described reactor or burner 1.

As a matter of fact and in accordance with the foregoing, when the apparatus is operating as nitrogen generator, a combustion is effected in reactor 1, shown in FIG. 1 and particularly in FIGS. 2 through 6, with a resulting emission of nitrogen, carbon dioxide and steam from the reactor or burner.

In accordance with the foregoing, the gaseous mixture reaching the reactor 1 through the mixer 5 comprises air as supplied along tube 7 by fan 6 and fuel gas (propane or methane gas) being fed along tube 4. From tube 7 said air arrives at mixer 5 through a diaphragm 71.

To ensure a thorough combustion between oxygen and fuel, care is taken that the mixture being supplied to the burner or reactor 1 contains an excess of oxygen. In addition, said excess of oxygen substantially assures the complete absence of carbon monoxide in the combustion products. However, it is provided that such an exceeding amount of oxygen is quite reduced, for example 1.5%. Thus, some exceeding amount of oxygen is required for the above specified objects but, on the other hand, an undue amount of oxygen is unacceptable when the apparatus is operating as nitrogen generator, or would have an opposite effect as the apparatus operates to abate oxygen within the cell or storage room wherein the products to be preserved are stored.

As from the foregoing, the desired air-fuel gas composition is provided or adjusted either by acting on air valve 8 or gas valve 9.

Since heat is developed by the combustion, the above described water cooling system is provided. Water from a suitable source or supply along said tube 14 first produces a cooling effect in condenser 11, and then moves through the gaps of the above described plates 42 and 43, that is the gap 51 of the upper plate or cover 42 and the similar gap 55 of the lower plate or cover 43.

At the outlet of reactor 1, the combustion products (nitrogen, carbon dioxide and steam) are conveyed along tube 12 to condenser 11 where, in accordance with the foregoing, such products are further cooled down, substantially to room temperature.

Therefore, steam is condensed and exhausted along tube 13 in the form of liquid state water. As better explained hereinafter, at any time of the operation of the apparatus as a generator, one and only one of the absorbers 2 or 3 is operating, while the other is at scavenging or regenerating step, such operations of the two absorbers 2 and 3 being in alternate sequence to each other. For example, assume that absorber 2 is operating and accordingly absorber 3 is at scavenging or regenerating step. Through valve 21 a mixture exits from condenser 11, this mixture comprising carbon dioxide and nitrogen as, above mentioned, the water has been removed along tube 13. Said three-way valve 21 closes the passage to the tube 24 leading to the stack, so that said gaseous mixture passes through tube 23.

Valve 26 of absorber 3 prevents said gaseous mixture from entering said absorber 3 which, as above mentioned, is at scavenging or regenerating step.

On the other hand, valve 25 of generator 2 allows the passage of said gaseous mixture from tube 27 to generator 2. Said generators or absorbers 2 and 3 contain active carbon for the absorption of carbon dioxide. Therefore, as above stated, the carbon dioxide forming part of the mixture supplied through tubes 23 and 27 and valve 25 to generator 2 is retained in the latter.

Valve 31 is under such conditions that communication is permitted between absorber 2 and tube 33 leading to valve 34, the latter being in turn under such conditions that communication is permitted with tube 30 leading to the cell or storage room. Therefore, nitrogen exiting from absorber 2 is fed through tubes 33 and 30 to said cell or storage room.

As above mentioned, while absorber 2 is in operation and retains carbon dioxide, so that only nitrogen is fed to the cell or storage room, absorber 3 is at scavenging or regenerating step. Thus, scavenging is necessary in that said absorber, which in the preceding step operated to retain carbon dioxide, has become substantially saturated with carbon dioxide which accordingly has to be ejected.

As scavenging is being carried out, air supplied by fan 6 through tube 10 is conveyed to absorber 3 through valve 32 which, at this stage, is under the conditions to allow the connection between said tube 10 and the inside of the valve.

Valve 26 opens the passage between absorber 3 and tube 28, while valve 29 establishes communication between tube 28 and tube 24 leading to exhaust or outlet.

The scavenging air thus passing through said absorber 3 exits therefrom through valve 26 carrying along carbon dioxide and such a mixture is conveyed through tubes 28 and 24 to the stack, or outlet.

Therefore, assuming that absorber 2 is operating to retain carbon dioxide and absorber 3 at scavenging stage, as above mentioned, it clearly appears that at some time, on continued absorption of carbon dioxide, said absorber 2 will lose its capability of absorbing carbon dioxide.

An automatic control circuit performs switching operations, so that valve 25 can close the passage between tube 27 and absorber 2 while valve 26 can open the passage between said tube 27 and absorber 3. Similarly, the two valves 31 and 32 are switched, so that tube 10 is connected with absorber 2 and absorber 3 is connected with tube 33. Owing to said switching operations through valve 25, absorber 2 is connected with tube 28.

Thus, a stage is initiated, in which the absorbers 2 and 3 have exchanged the functions relative to the preceding stage, that is the nitrogen-carbon dioxide mixture is fed to absorber 3, retaining carbon dioxide, so that nitrogen is emitted from said absorber and supplied to the cell or storage room through tubes 33 and 30, while absorber 2 is at scavenging stage, or has air supplied thereto through tube 10 and said air exits therefrom carrying carbon dioxide along through valve 25 to arrive through tubes 28 and 24 at the outlet or exhaust.

Returning to the time at which an absorber becomes saturated with carbon dioxide so that, as above mentioned, the valves are automatically switched to initiate the scavenging of said absorber and the operation of the other absorber to retain carbon dioxide contained in the mixture from the condenser 11, it will be seen that some amount of oxygen is present in that absorber in which the scavenging operation has been effected, that is just completed.

Therefore, it is contemplated that for some time, at the beginning of the new stage in which said absorber receives the gases from the condenser 11, the gas exiting from said absorber is not fed to the cell or storage room, but fed through the valve 34 to the stack. After some time, when the oxygen contained in the involved absorber has been substantially removed, the valve 34 is switched so that the nitrogen exiting from the absorber is fed through the tube 30 to the cell or storage room. Thus, an unacceptable amount of oxygen is prevented from being fed to the cell or storage room.

It should also be noted that at the beginning of the above described operation of the apparatus as a generator, the gaseous mixture from the condenser 11 is for some time supplied to the outlet or exhaust through the tube 24, with said movable member of valve 21 being positioned to this end. This is necessary to enable the burner to reach the normal catalytic temperature, above which a constant combustion is provided.

A thermostat provides for switching said valve 21 when said temperature is attained, so that the nitrogen-carbon dioxide mixture is supplied to an absorber. From the foregoing, during the operation of the apparatus, the above described cooling device for the burner is operated, substantially without any risk of breakages or failures, since the stresses are smooth and even, and a smooth combustion is provided, substantially without any risk of flash backs. The non-return or check valve 40 and automatic condensate trap 39 also operate with the above described advantages.

It is apparent that during the preserving period for the products, such as fruit and vegetable products, in the cell(s) such products will continue to slowly absorb oxygen with emission of carbon dioxide and steam, so that the percentage of carbon dioxide would tend to increase.

The percentage of carbon dioxide can be controlled by using the second function of the apparatus that, in such a case, operates as a "decarbonizer," that is as an absorber of carbon dioxide from the cell or storage room, while the operation of the above described reactor 1 is shut off.

Therefore, assume that reactor 1 is not operating and the apparatus is just operating to absorb carbon dioxide from the cooled cell or storage room.

The fan 36 sucks the cell or storage room atmosphere reaching the fan through the tube 35, and accordingly with said valve 37 enabling the passage of the gaseous mass, the latter being supplied by fan 36 to one of the above described two absorbers, while also in this case the second or other absorber is at scavenging stage.

Thus, for example, should absorber 2 be operating, said gasous mass from the cell or storage room through said tubes 35 and 38 would penetrate into absorber 2 through valve 25, which is set for such a passage, and then carbon dioxide in such a gaseous mass is retained or entrapped in said absorber 2. As depleted of carbon dioxide, the gaseous mass is transferred from absorber 2 to tube 33 and therefrom to tube 30, thus returning to said cell or storage room, with valves 31 and 34 suitably set for allowing such passages.

At the same, absorber 3 is at scavenging stage or receives air from said fan 6 through tube 10 and valve 32 and said air, carrying along carbon dioxide, exits from absorber 3 through valve 26 reaching said tube 28 and tube 24 through valve 29 and the stack.

Then, when said absorber 2 is saturated with carbon dioxide, the functions are reversed, that is absorber 3 will be operating, while scavenging of absorber 2 is started. In other terms, the gaseous mixture from the cell or storage room through tube 35 is in this stage supplied to absorber 3, exiting therefrom depleted of carbon dioxide to return to said cell or storage room through tubes 33 and 30. In this step, the air from fan 6 provides for scavenging operation of absorber 2 and is then conveyed to the stack.

Valve 29 is operating only when said apparatus is effective as decarbonizer, that is as absorber of carbon dioxide from the cell or storage room, whereby the generator or reactor 1 is shut off. When said generator 1 is operating, said valve 29 is always positioned to supply the liquid mass or volume to the stack.

Returning now to the operation of the apparatus as absorber of carbon dioxide from the cell or storage room, it will be appreciated that prior to starting the scavenging operation for an absorber, the latter has therein some amount of "cell or storage room atmosphere," which is rich of nitrogen and poor of oxygen.

It is convenient to recover this amount of cell or storage room atmosphere, since after some cycle an unacceptable depression or vacuum would be otherwise built up in the cell or storage room, such that the hydraulic guards should be operated, and as a result air and accordingly oxygen would therethrough enter the cell or storage room. Further, due to faulty sealings, a similar phenomenon would occur, still before the operation of the hydraulic guards, that is air would enter the cell or storage room from outside.

Therefore, for a short time at the beginning of the step at which the scavenging air is supplied to said absorber, it is arranged that the gaseous mass or volume is fed by valve 29 to the cell or storage room through the tube 30, whereupon valve 29 is switched for conveying the scavenging air through tube 24 to the stack. Furthermore, at the beginning of the step at which an absorber receives the atmosphere from the cell or storage room to retain carbon dioxide, it is provided that by means of valve 34 the oxygen in the absorber as a result of the preceding scavenging as above described is exhausted. Then, said valve 34 is switched for supplying the cell or storage room with the gaseous mass or volume from the absorber.

Also when the apparatus is simply operating as a decarbonizer, that is to remove carbon dioxide as built up in the cell or storage room, and wherein the burner is shut off, said non-return or check valve 40 and automatic condensate trap 39 operate with the above described advantages.

The above described apparatus may also find other applications than those herein outlined. Thus, for example, the apparatus may be simply used as a nitrogen generator for nitrogen to be fed to an environment wherein for any reason an atmosphere poor of oxygen and rich of nitrogen is desired. In such a case, said absorbers 2 and 3 would be simply effective to absorb carbon dioxide developed in reactor 1.

What is claimed is:

1. An apparatus capable of operating both as nitrogen generator and carbon dioxide absorber, particularly for preserving under controlled atmosphere fruit and vegetable products and the like, comprising a generator, including a reactor receiving therein a mixture of air and fuel gas, such as propane or methane gas, means for feeding said mixture to said reactor, the reactor comprising a burner space for combustion, so that gaseous combustion products exit from the reactor and comprise nitrogen and carbon dioxide, two absorbers, each suitable to retain carbon dioxide, a condenser downstream of the reactor and upstream of the absorbers having the gaseous combustion products passing therethrough, so that steam in said combustion products is condensed and claimed as water in a liquid state, means for water cooling said condenser and burner space, means for feeding the gaseous combustion products comprising nitrogen and carbon dioxide from the condenser to both absorbers, means for feeding gas exiting from either absorber to a product-containing cell or storage room, or alternatively to an exhaust or outlet, means for connecting said cell or storage room, with either absorber for supply of the cell or storage room atmosphere, means for feeding scavenging air to the absorbers, means by which when an absorber is operating to retain carbon dioxide of the gaseous volume from the burner or cell, the other absorber having scavenging air passing therethrough and vice-versa, and means for operating the apparatus only as either nitrogen generator or absorber of carbon dioxide of the cell or storage room atmosphere, said reactor comprising two parts which substantially form two opposite walls of said burner space, each of said walls comprising two opposed sheets spaced from each other and having laterally spaced indentations along a dimension thereof, the indentations being disposed on both sheets confronting each other and in contact along the full dimension defining a seal therebetween to define separate channel paths having rods inserted therein for flow of cooling water therethrough along predetermined, substantially coiled paths to maintain said walls at substantially uniform temperature distribution and to facilitate substantially smooth combustion with substantially complete elimination of flashback and a substantial reduction in the risk of failure because of uneven temperature districution, said apparatus further comprising a tube conveying the gaseous volume from either absorber, which has retained carbon dioxide, a three-way valve connected to said tube and having two tubular sections extending therefrom and respectively connected to a tube leading to an outlet, the last-mentioned tube, and a tube leading to the cell having a non-return check valve provided in the tubular section between said three-way valve and tube leading to the stack, for allowing the passage of said gaseous volume only in the direction from said three-way valve to said tube leading to the stack.

2. An apparatus according to claim 1, wherein said opposite walls of the burner respectively comprise a manifold for passing the gaseous mixture directed to the burner, and a second manifold through which the combustion products exit and are supplied to said condenser, each of said walls comprising respectively including two separate channels intended to be passed through by cooling water.

3. An apparatus according to claim 2, wherein each of said opposite walls of the burner comprise a sheet bent at a midway position to form said manifold and two sheets welded to said first mentioned sheet therewith forming said two channels.

4. An apparatus according to claim 1, wherein said non-return check valve comprises two rings sealingly secured to the inner surface of said tubular section and a wire mesh clamped between said rings, a disc of flexible light material provided and secured at a location thereof to said rings.

5. An apparatus according to claim 1, including an automatic condensate trap provided at a location of the path leading through the absorbers the gaseous volume from the condenser downstream of the burner or cell or storage room.

6. An apparatus according to claim 5, wherein said automatic condensate trap comprises a chamber, a tube connected at the top of said chamber, through which the gaseous mixture from said condenser is fed when the apparatus is operating as a generator, and a pipe through which the gaseous mixture from the cell or storage room is fed when the apparatus is operating only as carbon dioxide absorber and with a pipe having two sections extending therefrom and respectively leading to the two absorbers provided in said chamber, water droplets from either of said two pipes being collected therein, a float carrying a member for closing by gravity a water exhaust conduit, so that when at the bottom of said chamber the water is at a certain level, said float will raise to clear said exhaust conduit allowing the outlet of water, whereupon as the water level is lowered again, said float moves downward, again causing the closing of said outlet conduit, and so on, and said water exhaust conduit.

7. An apparatus according to claim 1, comprising a three-way valve having connected thereto a tube through which the gaseous volume from either absorber is fed to the three-way valve when the absorber has scavenging air supplied thereto, said valve being alternatively connectable with a pipe leading to the stack or a pipe leading to the cell or storage room, means provided by which at the beginning of a stage at which one of said absorbers has the scavenging air supplied thereto after the absorption in said absorbers of the carbon dioxide of the atmosphere from said cell or storage room, said three-way valve enabling the passage of the gaseous volume within said pipe leading to the cell or storage room, to allow for the return to said cell or storage room of the atmosphere in the absorber at the end of the preceding step, whereupon and after a predetermined period of time, during which said atmosphere has moved back to the cell or storage room, the valve is switched, so that the gaseous mixture from the absorber is supplied to the pipe leading to the stack.

* * * * *